US012353609B2

(12) United States Patent
Nelogal et al.

(10) Patent No.: US 12,353,609 B2
(45) Date of Patent: Jul. 8, 2025

(54) METHOD AND SYSTEM FOR A SECURE MANAGEMENT OF STORAGE DEVICES USING A KEY MANAGEMENT SERVICE

(71) Applicant: Dell Products L.P., Round Rock, TX (US)

(72) Inventors: Chandrashekar Nelogal, Round Rock, TX (US); James Peter Giannoules, Round Rock, TX (US); Marcelo S. Saraiva, Austin, TX (US); Karthikeyan Rajagopalan, Austin, TX (US); Sanjeev S. Dambal, Austin, TX (US); Sisir K. Dash, Bangalore (IN); Sura Reddy, Kothapalli (IN)

(73) Assignee: DELL PRODUCTS L.P., Round Rock, TX (US)

( * ) Notice: Subject to any disclaimer, the term of this patent is extended or adjusted under 35 U.S.C. 154(b) by 310 days.

(21) Appl. No.: 17/507,431

(22) Filed: Oct. 21, 2021

(65) Prior Publication Data

US 2023/0132176 A1 Apr. 27, 2023

(51) Int. Cl.
*G06F 21/78* (2013.01)
*G06F 3/06* (2006.01)
*G06F 9/4401* (2018.01)
*H04L 9/06* (2006.01)
*H04L 9/08* (2006.01)

(52) U.S. Cl.
CPC ............ *G06F 21/78* (2013.01); *G06F 3/0623* (2013.01); *G06F 3/0634* (2013.01); *G06F 3/0659* (2013.01); *G06F 3/0673* (2013.01); *G06F 9/4401* (2013.01); *H04L 9/06* (2013.01); *H04L 9/0816* (2013.01)

(58) Field of Classification Search
CPC ...... G06F 21/78; G06F 3/0623; G06F 3/0634; G06F 3/0659; G06F 3/0673; G06F 9/4401; H04L 9/06; H04L 9/0816
See application file for complete search history.

(56) References Cited

U.S. PATENT DOCUMENTS

| | | | |
|---|---|---|---|
| 10,523,434 B1 * | 12/2019 | Sharifi Mehr | ........ H04L 9/0891 |
| 11,120,151 B1 * | 9/2021 | Allo | ......................... G06F 21/80 |
| 11,431,488 B1 * | 8/2022 | Sapuntzakis | ............ H04L 9/085 |
| 2015/0121028 A1 * | 4/2015 | Gupta | ..................... H04L 63/10 |
| | | | 711/164 |

(Continued)

*Primary Examiner* — Carl G Colin
*Assistant Examiner* — Zhe Liu
(74) *Attorney, Agent, or Firm* — Chamberlain, Hrdlicka, White, Williams & Aughtry; Aly Z. Dossa (57) ABSTRACT

A method for managing a storage system includes initiating, by a hardware resource manager, a boot-up of a storage controller managing the storage system comprising a plurality of storage devices, making a determination, by the storage controller, that the storage controller is in a secured mode, based on the determination: identifying a security state of each of the plurality of storage devices, determining that a storage device of the plurality of storage devices is in an unsecured state, and based on the unsecured state, sending, by the storage controller, a security operation request for securing the storage device, obtaining a secure state response from the hardware resource manager corresponding to securing the storage device, and based on the secure state response, resuming operation of the storage controller based on the secure mode.

10 Claims, 7 Drawing Sheets

(56) References Cited

U.S. PATENT DOCUMENTS

| | | | | |
|---|---|---|---|---|
| 2016/0110111 A1* | 4/2016 | Song | .................... | G06F 3/0632 |
| | | | | 711/103 |
| 2017/0085374 A1* | 3/2017 | Chen | ...................... | H04L 9/083 |
| 2017/0337140 A1* | 11/2017 | Ragupathi | ............... | G06F 21/78 |
| 2018/0276385 A1* | 9/2018 | Heck | ..................... | G06F 3/0634 |
| 2019/0205109 A1* | 7/2019 | Smitthimedhin | ... | G06F 11/3006 |
| 2020/0119985 A1* | 4/2020 | Matthews | ............... | G06F 9/541 |
| 2020/0242051 A1* | 7/2020 | Bisa | .................... | G06F 11/1076 |
| 2020/0327024 A1* | 10/2020 | Alkalay | .................. | G06F 3/064 |
| 2021/0067323 A1* | 3/2021 | Dambal | .................. | H04L 9/083 |
| 2021/0279335 A1* | 9/2021 | Olarig | .................... | H04L 67/34 |
| 2022/0004506 A1* | 1/2022 | Connolly | ............... | G06F 21/79 |
| 2022/0382914 A1* | 12/2022 | Anchi | .................... | H04L 9/083 |
| 2022/0385464 A1* | 12/2022 | Anand | .................... | H04L 9/14 |

\* cited by examiner

METHOD AND SYSTEM FOR A SECURE MANAGEMENT OF STORAGE DEVICES USING A KEY MANAGEMENT SERVICE

BACKGROUND

Protecting the sensitive information stored on storage devices is one of the most important things that organizations are focusing on these days. As data stored on drives may contain critical information, it is important that they should be insured in such a way that an adversary cannot steal the data even if they get access to the drives.

SUMMARY

In general, certain embodiments described herein relate to a method for managing a storage system. The method includes initiating, by a hardware resource manager, a boot-up of a storage controller managing a storage system comprising a plurality of storage devices, making a determination, by the storage controller, that the storage controller is in a secured mode, based on the determination: identifying a security state of each of the plurality of storage devices, determining that a storage device of the plurality of storage devices is in an unsecured state, and based on the unsecured state, sending, by the storage controller, a security operation request for securing the storage device, obtaining a secure state response from the hardware resource manager corresponding to securing the storage device, and based on the secure state response, resuming operation of the storage controller based on the secure mode.

In general, certain embodiments described herein relate to a non-transitory computer readable medium that includes computer readable program code, which when executed by a computer processor enables the computer processor to perform a method for managing storage systems. The method includes initiating, by a hardware resource manager, a boot-up of a storage controller managing a storage system comprising a plurality of storage devices, making a determination, by the storage controller, that the storage controller is in a secured mode, based on the determination: identifying a security state of each of the plurality of storage devices, determining that a storage device of the plurality of storage devices is in an unsecured state, and based on the unsecured state, sending, by the storage controller, a security operation request for securing the storage device, obtaining a secure state response from the hardware resource manager corresponding to securing the storage device, and based on the secure state response, resuming operation of the storage controller based on the secure mode.

In general, certain embodiments described herein relate to a system for managing a storage system. The system includes a plurality of storage devices, a hardware resource manager programmed to: initiate a boot-up of the storage controller managing a storage system comprising the plurality of storage devices, a storage controller programmed to: make a determination that the storage controller is in a secured mode, based on the determination: identify a security state of each of the plurality of storage devices, determine that a storage device of the plurality of storage devices is in an unsecured state, and based on the unsecured state, send a security operation request for securing the storage device, obtain a secure state response from the hardware resource manager corresponding to securing the storage device, and based on the secure state response, resume operation of the storage controller based on the secure mode.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art, that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements.

A second data structure, also labeled as A to N, may also include any number of elements. The number of elements of the first data structure and the number of elements of the second data structure may be the same or different.

In general, embodiments of the invention relate to a method and system for managing a storage system. Currently there are a few methods to manage drives behind redundant arrays of independent disks (RAID) controllers. In traditional implementations, a RAID controller itself will generate keys based on inputs from users and manages them to protect self-encrypting drives (SEDs) behind it. There may be some RAID controllers which are not capable of protecting the SEDs behind them on their own as mentioned in the above two methods, because of computational resource limitations. Further, implementation of the software to manage the lifecycle of the SEDs can be complex and will exceed the resource constraints of the RAID controller. For such RAID controllers, there is a need for an external agent, like a baseboard management controller (BMC) to manage life cycle of SEDs behind the RAID controller. BMC will interact minimally with the RAID controller for security management of drives, while the RAID controller, acts as a pass-through entity for the most part.

In one or more embodiments of the invention, the keys can be from an external key management server (KMS), made available to the RAID controller using a hardware resource manager. The hardware resource manager may be, for example, a baseboard management controller (BMC), which in turn uses the key(s) to protect the SEDs connected to it. The protection may be performed using encryption algorithms applied to the data in the SEDs.

Embodiments of the invention include a method for protecting the SEDs behind a RAID controller in a pass-through way, in which the RAID controller acts as a pass-through conduit for key exchange traffic between a BMC and the SEDs. The BMC can generate keys either locally or remotely using servers that implement key management protocols.

For example, the BMC includes functionality for generating and managing keys locally or act as a key exchange manager that retrieves keys from a KMS. Further, the RAID controller performs initial discovery of the SEDs and presents the states of the SEDs to the BMC. Following the initial discover, the RAID controller may act as a pass-through conduit for key exchange traffic between the BMC and the SEDs.

During operation, the RAID controller operates in two modes: secured and unsecured mode. In secured mode, the RAID controller manages, in a secure manner, the storage of data in the SEDs. In contrast, in unsecured mode, the storage controller may manage unsecured storage devices. In an embodiment in which the storage controller is switched from a secure mode to an unsecured mode, remediation action is performed to manage the currently secured storage devices to prevent undesired access to the data. The remediation action may include deleting virtual disks (VDs) on which the data in the storage devices are accessed (e.g., by the storage controller). In this manner, the encrypted data of the secured storage devices may not be accessible, thus securing the integrity of the data. In one or more embodiments of the invention, the virtual disk system is extensible. That is, the security mode of the storage controller (e.g., either secured or unsecured) is to match the security state of the storage devices in the storage system.

Embodiments of the invention further include methods for managing the insertion of a new storage device to provide the management on the new storage devices during operation of the storage controller. In one or more embodiments of the invention, updating the storage system to include the new storage device during operation of the storage controller.

Figure 1:
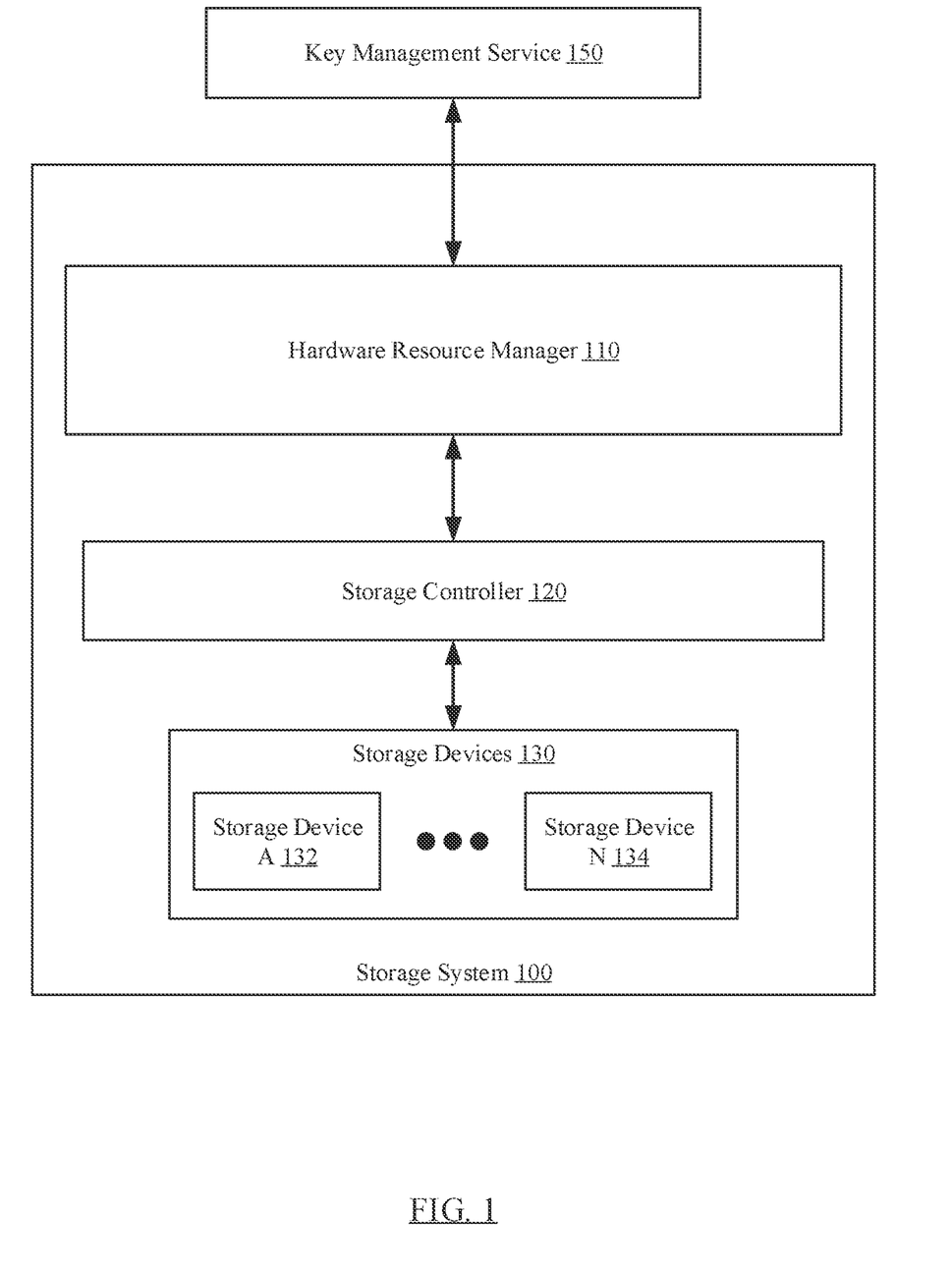
FIG. 1 shows a diagram of a system in accordance with one or more embodiments of the invention.

FIG. 1 shows an example system in accordance with one or more embodiments of the invention. The system includes a key management service (150) and a storage system (100) that includes one or more storage devices (130), a storage controller (120) that manages the storage devices (130), and a hardware resource manager (110). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the storage controller (120) manages the operation of the storage devices (130). Specifically, the storage controller (120) manages the access to data that may be secured in the storage devices (132, 134) by initiating unlocking operations and/or security operations on the storage devices (130). The storage controller (120) may utilize resources of the hardware resource manager (110) to implement any portion of the management of the storage devices (130).

While the system of FIG. 1 is illustrated as only including one storage system (130), the storage controller (120) may manage the operation of any number of storage systems without departing from the invention.

Figure 4:
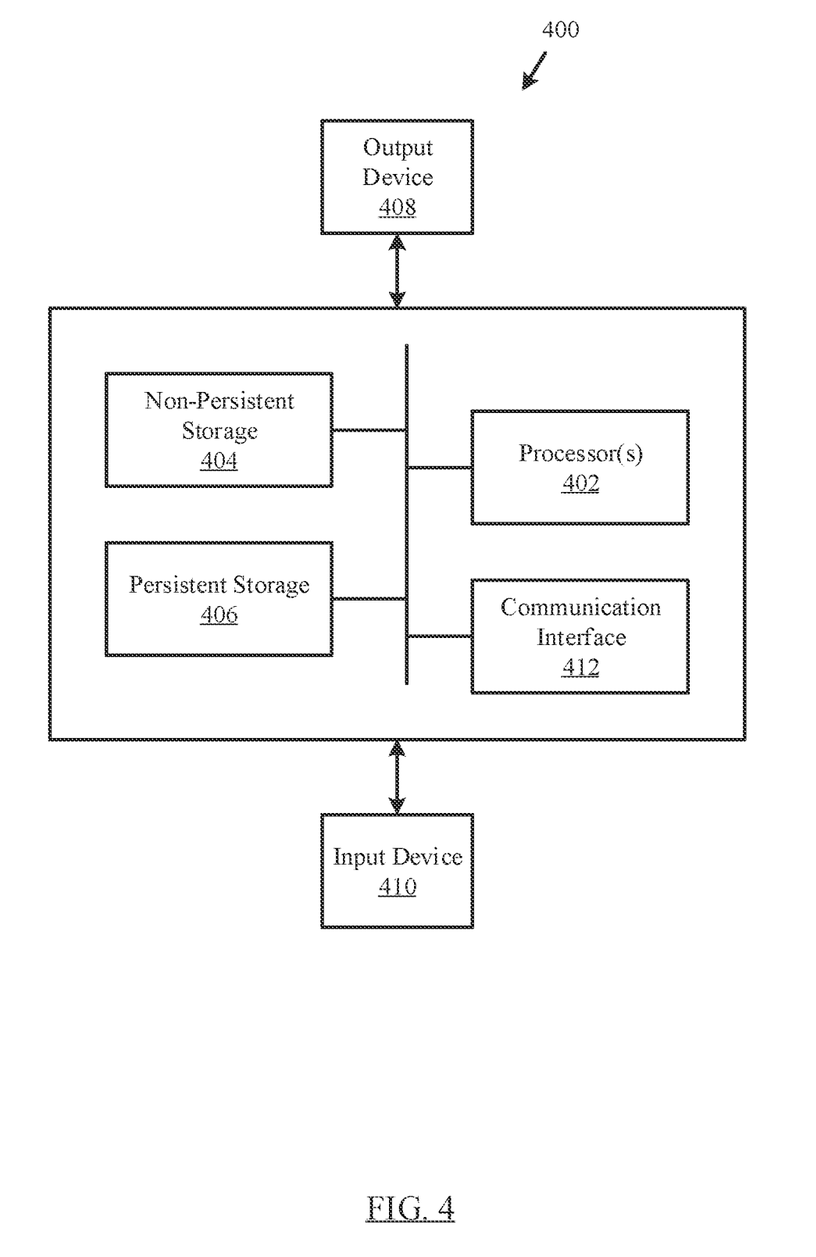
FIG. 4 shows a diagram of a computing device in accordance with one or more embodiments of the invention.

In one or more embodiments of the invention, the storage controller (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the storage controller (140) described throughout this application and/or all, or a portion thereof, of the methods illustrated in FIGS. 2B-2C, described below.

In one or more embodiments of the invention, the storage controller (120) is implemented as a logical device. The logical device may utilize the hardware computing resources of any number of computing devices, and thereby provide the functionality of the storage controller (120) described throughout this application and/or all, or a portion thereof, of the methods illustrated in FIGS. 2B-2C.

In one or more embodiments of the invention, the hardware resource manager (110) manages the resources used by the storage systems. Some of the resources managed by the hardware resource manager (110) may not be illustrated in FIG. 1. For example, the hardware resource manager (110) may manage the power supplied to the storage controller (120) and/or the storage devices (130). As another example, the hardware resource manager (110) may manage the fan speed of fans designed to cool the computing resources of the storage system (100).

In one or more embodiments of the invention, the hardware resource manager (110) includes functionality for providing security management services. The security management services may include performing security operations initiated by the storage controller (120). The security operations may include, for example, unlocking a secured storage device or otherwise including the storage device using a hot insertion of the storage device. As a second example, the security operations may include securing an unsecured storage device. The hardware resource manager (110) may perform the security operations in accordance with the method of FIG. 2D.

In one or more embodiments of the invention, the hardware resource manager (110) manages the security mode of the storage controller (110). The security modes may be initiated by administrative systems (not shown) that manage the operation of the storage system (100) and/or utilize the security management services provided by the hardware resource manager (110). The hardware resource manager (110) may manage the security mode of the storage controller (120) in accordance with FIG. 2A.

In one or more embodiments of the invention, the hardware resource manager (110) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the hardware resource manager (110) described throughout this application and/or all, or a portion thereof, of the methods described in FIGS. 2A and 2D.

In one or more embodiments of the invention, hardware resource manager (110) is implemented as a baseboard management controller (BMC). The BMC may include the computing components required to provide the BMC the capability for performing the functionality of the hardware resource manager (110) described throughout the application and/or all, or a portion thereof, of the methods described in FIGS. 2A and 2D.

In one or more embodiments of the invention, the storage system (100) stores data. The data may be generated by and/or stored from the storage devices (130). The storage system (100) may utilize the storage devices (130) to store the data. Any number of storage devices (130) may be used to store the data. The storage devices (130) may be configured in any manner for utilization of storage. For example, the storage devices (130) may be in a secured state. As used herein, a secured state refers to a In one or more embodiments of the invention, the storage system (130) provides services to users, e.g., clients (not shown). For example, the services may include the use of the storage system (150) to store data, read stored data, and/or otherwise access the storage system (150). Further, the storage system (100) may include services for securing the data stored in the storage devices (130). The management of the security states may be initiated by the storage controller (120) of the storage system (100). The storage controller (120) may offload any portion of the management to the hardware resource manager (110). For example, during an initial boot-up, the storage controller (120) may perform initial discovery on the storage devices (130) to identify the current security states of the storage devices (132, 134). Based on the security mode of the storage controller (120), the storage controller may remediate the security states of the storage devices (130) to maintain consistency and security requirements.

In one or more embodiments of the invention, the storage controller (120) may operate in a secure mode (also referred to as a secured mode). In one or more embodiments of the invention, the secure mode refers to a mode of operation in which the storage controller (120) ensures the storage devices (130) are all secured (e.g., in a secured state). The storage controller (120) may ensure such state by communicating with the hardware resource manager (110) to specify whether it needs aid to place any unsecured storage devices to a secured state.

In one or more embodiments of the invention, the hardware resource manager (110) aids in the management of the security states of the storage devices (130) by managing the generation and/or storage of storage device keys. In one or more embodiments of the invention, the storage device keys are data structures that may be used to encrypt, decrypt, and/or otherwise modify the data in the storage devices (130) to prevent undesired access to the data in the storage devices (130). One storage device key may be used for all storage devices (132, 134) in the storage system (100). Alternatively, each storage device (132, 134) may correspond to a unique storage device.

In one or more embodiments of the invention, the data in the storage devices (130) may be encrypted by applying an encryption algorithm on the data using the corresponding storage device key(s). The data may be decrypted using the same storage device key or a decryption key without departing from the invention. Examples of encryption algorithms include, but are not limited to: data encryption standard (DES), Triple DES, Rivest-Shamir-Adleman (RSA), Blowfish, and Advanced Encryption Standard (AES).

In one or more embodiments of the invention, the storage devices (130) may include functionality for performing self-encryption. Specifically, the storage devices (130) may utilize the storage device keys to encrypt their respective data. As such, the storage devices (130) may be referred to as, for example, self-encrypting devices (SEDs).

In one or more embodiments of the invention, the storage devices (130) may implement virtual disks. In one or more embodiments of the invention, a virtual disk refers to a logical storage device that may include any virtual addresses that may be used to access the data stored in the respective physical addresses on the storage devices (130). In one or more embodiments of the invention, the virtual disks may store a copy of the data (e.g., encrypted or unencrypted) stored in the storage devices (130). In this manner, the access to the data in the storage devices (130) may require the use of the virtual disks. Further, the removal (e.g., a deletion) of a virtual disk may result in a loss of access to the data managed by the removed virtual disk. Such actions (e.g., the deletion or otherwise removal of the virtual disk) may be initiated strategically by the hardware resource manager (110) in response to an unsecured mode of the storage controller (120).

As used herein, the unsecured mode (also referred to as the unsecure mode) of the storage controller refers to a mode of operation of the storage controller (120) in which the storage of data is not secured by the storage controller. Specifically, in the unsecured mode, the storage controller (120) is not programmed to ensure the data in the storage devices (130) are encrypted. Such mode may compromise the integrity of the data in the storage devices (130) managed by the storage controller (110). As such, the hardware resource manager (110) may perform security state revert processes (discussed in FIG. 2A) to protect the integrity of the data of the storage devices.

In one or more embodiments of the invention, the storage system (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the storage system (100) described throughout this application.

In one or more embodiments of the invention, the storage system (100) is implemented as a logical device. The logical device may utilize the hardware computing resources of any number of computing devices and thereby provide the functionality of the storage system (130) described throughout this application.

While FIG. 1 shows a configuration of components, other configurations may be used without departing from the scope of embodiments described herein. Accordingly, embodiments disclosed herein should not be limited to the configuration of components shown in FIG. 1.

Figure 2A:
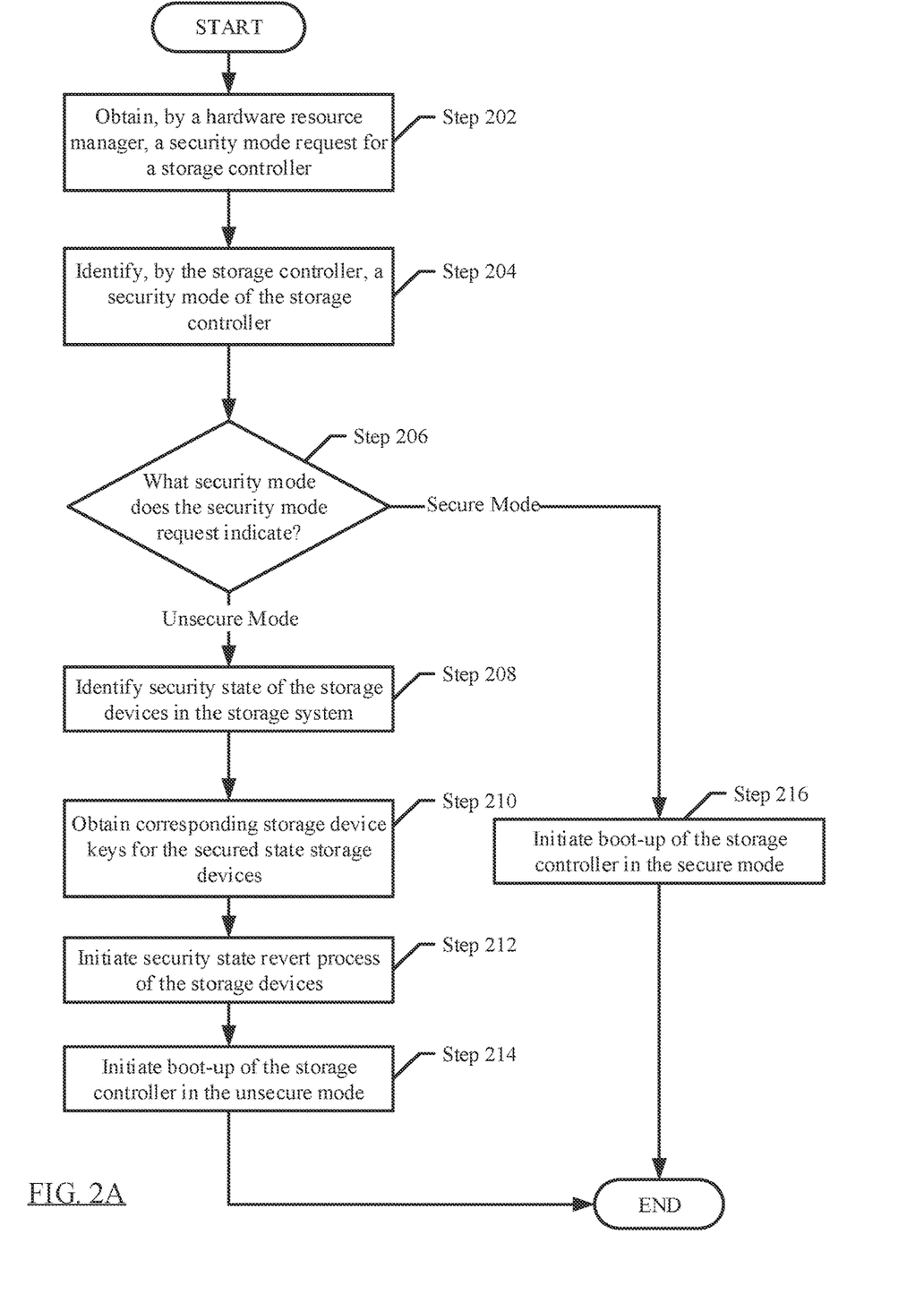
FIG. 2A shows a flowchart of a method for initializing a security mode of a storage controller by a hardware resource manager in accordance with one or more embodiments of the invention.

FIG. 2A shows a flowchart of a method for initializing a security mode of a storage controller by a hardware resource manager in accordance with one or more embodiments of the invention. The method of FIG. 2A may be performed by, for example, a hardware resource manager (110, FIG. 1). Other components of the system of FIG. 1 may perform all, or a portion, of the method of FIG. 2A without departing from the invention.

While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2A may be performed in parallel with any other steps shown in FIG. 2A-2D without departing from the scope of the invention.

Turning to FIG. 2A, in step 202, a security mode request is obtained for a storage controller. In one or more embodiments of the invention, the security mode request specifies converting the security mode of the storage controller from a first mode to a second mode. The security modes may be, for example, secure mode and an unsecure mode. The security mode request may be obtained from an administrative system.

In step 204, a security mode of the storage controller is identified. In one or more embodiments of the invention, the security mode is specified in the security mode request.

In step 206, a determination is made about which security mode (e.g., a secure mode or an unsecured mode) is specified in the security mode request. If a secure mode is specified, the method proceeds to step 216; if an unsecure mode is specified, the method proceeds to step 208.

In step 208, following the determination that the security mode request specifies initiating an unsecure mode, a security state of the storage devices is identified. In one or more embodiments of the invention, the security states are identified by communicating with each storage device to obtain a security state response from the storage devices. The communication may be performed using the storage controller. For example, the hardware resource manager may forward a message requesting the security states of the storage devices to the storage controller, who may forward such message to each storage device in the storage system. As another embodiment, the security states may be previously stored in the storage controller. The hardware resource manager may obtain such security states from the storage controller.

In step 210, corresponding storage device keys are obtained for the secured state storage devices. In one or more embodiments of the invention, the storage keys are obtained from a key management service. As discussed above, the key management service may manage the storage and/or generation of the storage device keys. The hardware resource manager may communicate with the key management service to obtain the storage device keys. A request for the storage device keys may be sent to the key management service with identifiers of the secured storage devices. In response to the request, the key management service may provide the requested storage device keys.

Alternatively, in one or more embodiments of the invention, the storage device keys may be managed by the hardware resource manager. Said another way, the storage device keys may be generated and/or stored by the hardware resource manager. In such embodiments, the hardware resource manager may obtain the storage device keys from its own storage.

In one or more embodiments of the invention, the storage device keys are obtained for the purpose of performing a security state revert process. For example, such storage device keys may be used to unlock the secured storage devices.

In step 212, a security state revert process is initiated for the storage device. In one or more embodiments of the invention, the security revert process is initiated by accessing, using the storage device keys, the virtual disk(s) operated using the storage devices and deleting the virtual disks. In this manner, though the storage controller is no longer in a secure mode, any data stored in the storage devices may not be accessed by an undesired entity.

In step 214, a boot-up of the storage controller is initiated. In one or more embodiments of the invention, the boot-up of the storage controller includes specifying the storage controller to initialize in the unsecured mode.

In step 216, following the determination that the security mode request specifies a secure mode, a boot-up of the storage controller is initiated. In one or more embodiments of the invention, the boot-up of the storage controller includes specifying the storage controller to initialize in the secured mode.

Figure 2B:
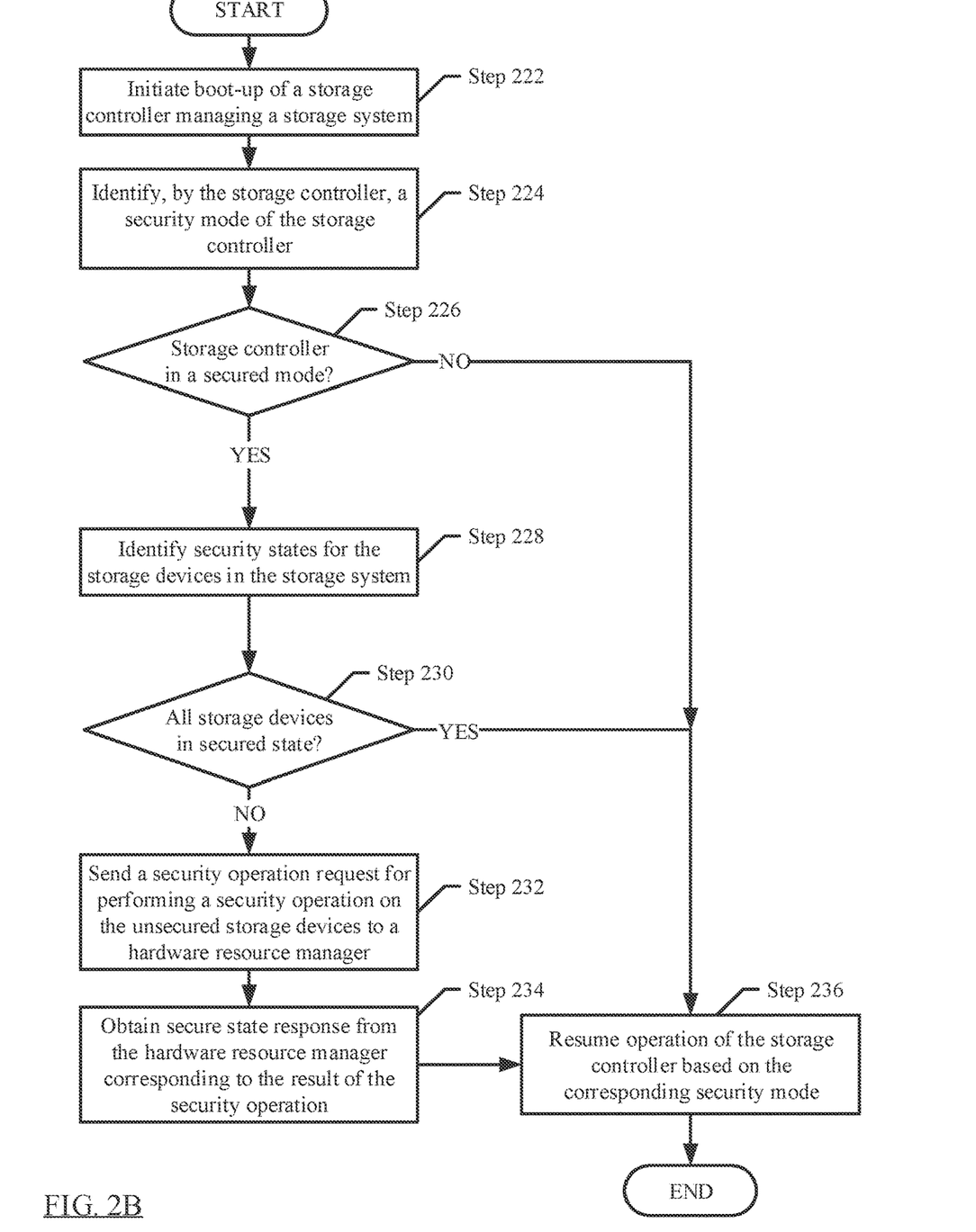
FIG. 2B shows a flowchart of a method for initializing boot-up of a storage controller in accordance with one or more embodiments of the invention.

For additional details regarding the initialization of the storage controller, see, e.g., FIG. 2B.

FIG. 2B shows a flowchart of a method for initializing boot-up of a storage controller in accordance with one or more embodiments of the invention. The method of FIG. 2B may be performed by, for example, a storage controller (120, FIG. 1). Other components of the system of FIG. 1 may perform all, or a portion, of the method of FIG. 2B without departing from the invention.

While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2B may be performed in parallel with any other steps shown in FIG. 2A-2D without departing from the scope of the invention.

Turning to FIG. 2B, in step 222, a boot-up of the storage controller is initiated. In one or more embodiments of the invention, the boot-up is initiated by a hardware resource manager (e.g., as discussed in FIG. 2A).

In step 224, a security mode of the storage controller is identified. In one or more embodiments of the invention, the security mode is identified from the hardware resource manager initiating the boot-up.

In step 226, a determination is made about whether the storage controller is in a secured mode. If the storage controller is in a secure mode, the method proceeds to step 228; otherwise, the method proceeds to step 236.

In step 228, following the determination that the storage controller is in a secured mode, the security states of the storage devices in the storage system are identified. In one or more embodiments of the invention, the security states are obtained from the storage devices (e.g., by communicating with the storage devices). The storage controller may perform an initial discovery of the storage devices to obtain required information of the storage devices such as, for example, whether the data in the storage devices are encrypted, whether a virtual disk is implemented by the storage device, the encryption algorithm used to encrypt the data, and/or any other information useful for the storage controller to determine the security state of the storage devices.

In step 230, a determination is made about whether all storage devices are in a secured state. If all storage devices are in the secured state, the method proceeds to step 236; otherwise, the method proceeds to step 232.

In step 232, following the determination that not all storage devices are secured, a security operation request on the unsecured storage devices is sent to the hardware resource manager. In one or more embodiments of the invention, the security operation request specifies securing the storage devices that are not currently secured. In this manner, while the storage controller is in a secured mode, the storage devices may be in secured states.

Figure 2C:
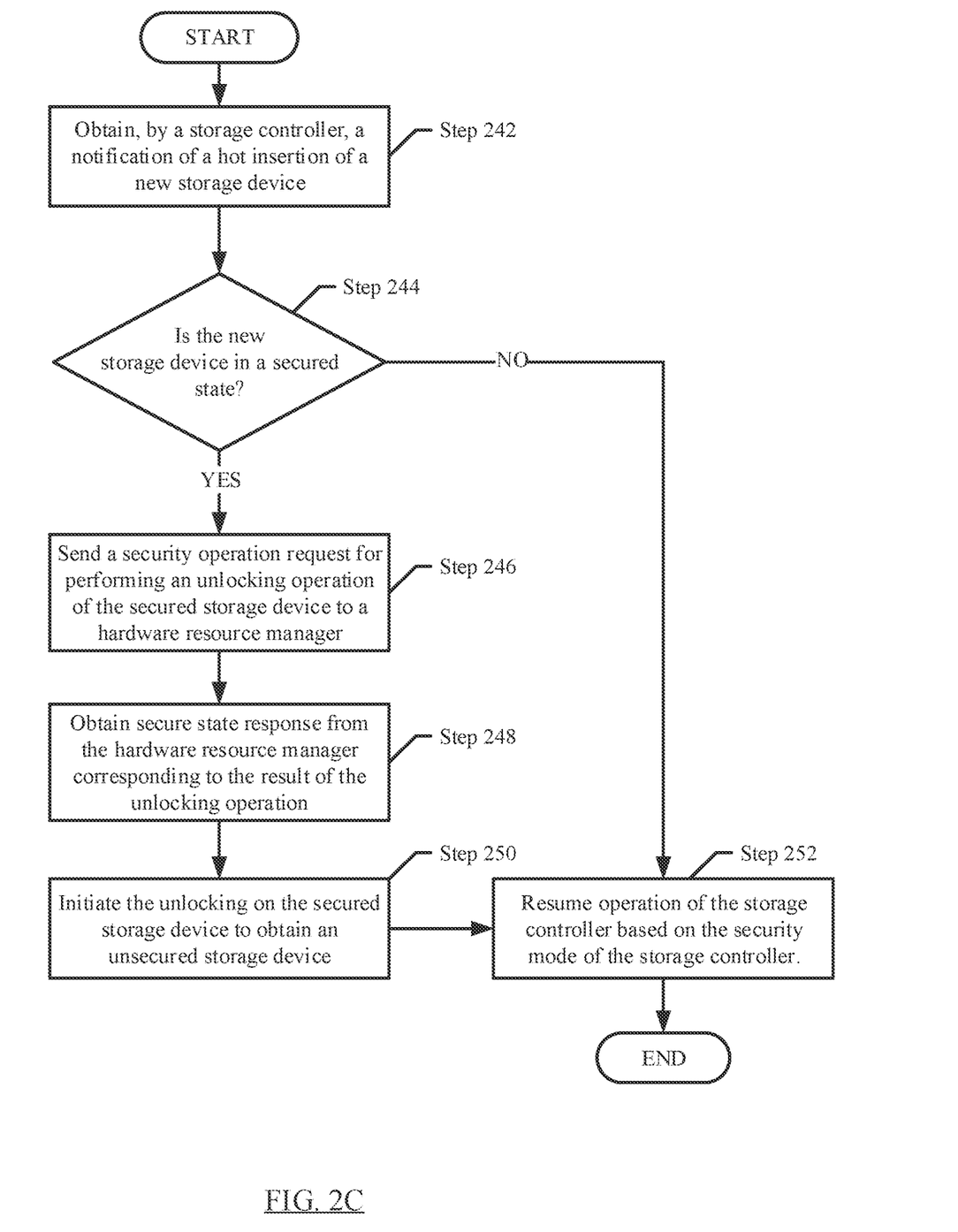
FIG. 2C shows a flowchart of a method for installing a new storage device in accordance with one or more embodiments of the invention.
Figure 2D:
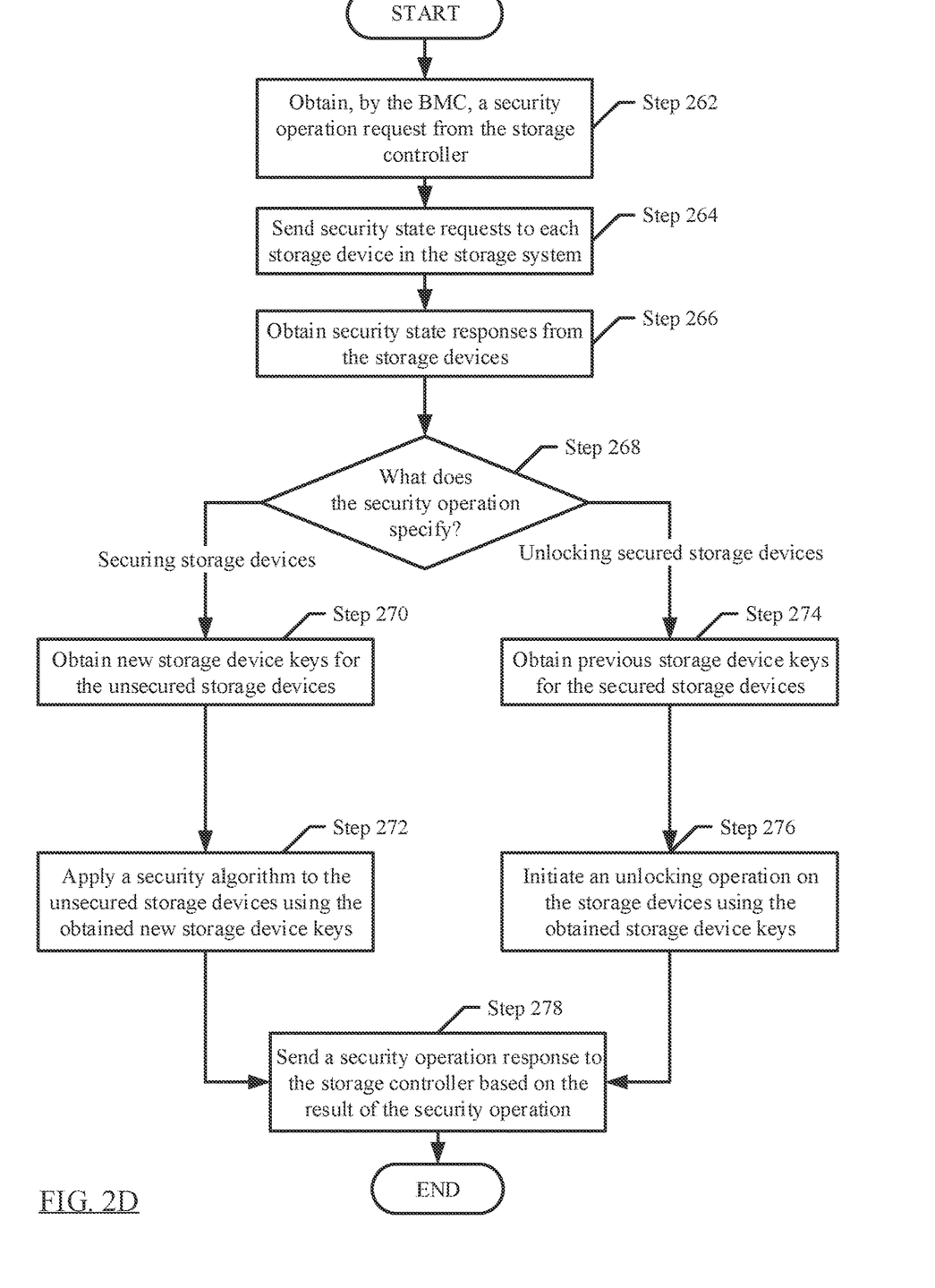
FIG. 2D shows a flowchart of a method for servicing security operation requests in accordance with one or more embodiments of the invention.

The security operation request may be serviced by the hardware resource manager in accordance with FIG. 2D.

In step 234, a response is obtained from the hardware resource manager that corresponds to the result of the security operation. The response may specify whether the security operation was performed successfully by the hardware resource manager. If the response specifies a successful security operation, the method may proceed as illustrated in FIG. 2B. In such embodiments in which the response indicates an unsuccessful security operation, the storage controller may perform, or otherwise initiate, a remediation to remediate the unsuccessful security operation. Such remediation actions may include, for example, removing the unsecured storage devices from the storage system, re-attempting the security operation, and/or modifying the security mode of the storage controller to an unsecured mode. Other remediation actions may be performed without departing from the invention.

In step 236, operation of the storage controller is resumed based on the corresponding security mode. In one or more embodiments of the invention, the storage controller is resumed to implement the specified security mode (e.g., secure mode or unsecured mode).

FIG. 2C shows a flowchart of a method for installing a new storage device in accordance with one or more embodiments of the invention. The method of FIG. 2C may be performed by, for example, a storage controller (120, FIG. 1). Other components of the system of FIG. 1 may perform all, or a portion, of the method of FIG. 2C without departing from the invention.

While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2C may be performed in parallel with any other steps shown in FIG. 2A-2D without departing from the scope of the invention.

In step 242, a notification is obtained by the storage controller of a hot insertion of a new storage device. In one or more embodiments of the invention, the notification is obtained from the storage device that notifies the storage controller of the insertion. As discussed above, a hot insertion of a storage device may refer to updating the storage system to include the new storage device during operation of the storage controller.

In step 244, a determination is made about whether the storage device is in a secured state. In one or more embodiments of the invention, the security state may be based on whether the data in the storage device is encrypted. If the storage device is in a secured state, the method proceeds to step 246; otherwise, the method proceeds to step 252.

In step 246, a security operation request is sent to the hardware resource manager that specifies performing an unlocking operation of the secured storage device. In one or more embodiments of the invention, the security operation request specifies unlocking the new storage device. The hardware resource manager may service the security operation request in accordance with FIG. 2D.

In step 248, a secure state response is obtained from the hardware resource manager that corresponds to the result of the unlocking operation. The response may specify whether the security operation was performed successfully by the hardware resource manager. If the response specifies a successful unlocking operation, the method may proceed as illustrated in FIG. 2C. In such embodiments in which the response indicates an unsuccessful unlocking operation, the storage controller may perform, or otherwise initiate, a remediation to remediate the unsuccessful locking operation. Such remediation actions may include, for example, removing the new secured storage device from the storage system or re-attempting the unlocking operation. Other remediation actions may be performed without departing from the invention.

In step 250, the unlocking is initiated on the secured storage device to obtain an unsecured storage device. In one or more embodiments of the invention, the security state response may include a storage device decryption key that may be used to initiate the unlocking operation. In such embodiments, the storage controller may initiate the unlocking using the obtained decryption key.

In step 252, operation of the storage controller is resumed based on the current security mode of the storage controller. In one or more embodiments of the invention, the operation resumed by the storage controller may be resumed based on the security mode of the storage controller. For example, if the storage controller is in a secure mode, and the new storage device is in an unsecured state, the storage controller may perform, at least a portion of, the method of FIG. 2B to communicate with the hardware resource manager to prepare the new storage device to be in a secure state.

FIG. 2D shows a flowchart of a method for servicing security operation requests in accordance with one or more embodiments of the invention. The method of FIG. 2D may be performed by, for example, a hardware resource manager (110, FIG. 1). Other components of the system of FIG. 1 may perform all, or a portion, of the method of FIG. 2D without departing from the invention.

While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2D may be performed in parallel with any other steps shown in FIG. 2A-2D without departing from the scope of the invention.

In step 262, a security operation request is obtained by the hardware resource manager. In one or more embodiments of the invention, the security operation request is obtained from a storage controller. The security operation request may be one of a security operation request discussed in either FIG. 2B or FIG. 2C. For example, the security operation request of FIG. 2B specifies securing the data stored in an unsecured storage device. As a second example, the storage operation request of FIG. 2C specifies performing an unlocking operation on a secured storage device.

In step 264, security state requests are sent to each storage device in the storage system. In one or more embodiments of the invention, the security state requests specifies identifying the security state of the storage devices. The security state requests may be forwarded to the storage devices via the storage controller. In this manner, the storage controller may serve as a pass-through component that forwards messages between the hardware resource manager and the storage devices.

In step 266, security state responses are obtained from the storage devices. The security state responses may specify the security states of the storage devices.

In step 268, a determination is made about what the security operation request specifies. If the security operation request specifies securing storage devices, the method proceeds to step 270; if the security operation request specifies unlocking secured storage devices, the method proceeds to step 274.

In step 270, following the determination that the security operation specifies securing unsecured storage devices, new storage devices keys are obtained for the unsecured storage devices. The new storage device keys are obtained from a key management service that generates the storage device keys. The key management service may generate the storage device keys for the unsecured storage devices identified in step 266 and store a data structure that tracks the storage device keys and the corresponding storage devices. Alternatively, such data structure may be provided to the hardware resource manager.

In step 272, a security algorithm is applied to the unsecured storage devices using the obtained new storage device keys. In one or more embodiments of the invention, the security algorithm includes performing an encryption algorithm on the data stored in the unsecured storage devices using the obtained new storage device keys.

In step 274, following the determination that the security process specifies unlocking secured storage devices, previous storage device keys of the secured storage devices are obtained. In one or more embodiments of the invention, the storage device keys are obtained from the key management service managing the storage device keys of the secured storage devices. The secured storage devices may be those identified in step 266. In one or more embodiments of the invention, the storage device keys obtained in step 274 are used to decrypt data in a storage device.

In step 276, an unlocking operation is initiated for the storage devices using the obtained storage device keys. In one or more embodiments of the invention, the unlocking operation is initiated by sending the obtained storage device keys to the secured storage devices to be used for accessing the data. In this manner, the storage devices may be installed to the storage system.

In step 278, a security operation response is sent to the storage controller based on the result of the security operation. In one or more embodiments of the invention, the security operation response specifies the result of performing the security operation. The security operation may be the security operation performed on steps 270-272. Alternatively, the security operation may be the security operation of steps 274-276.

EXAMPLE

Figure 3:
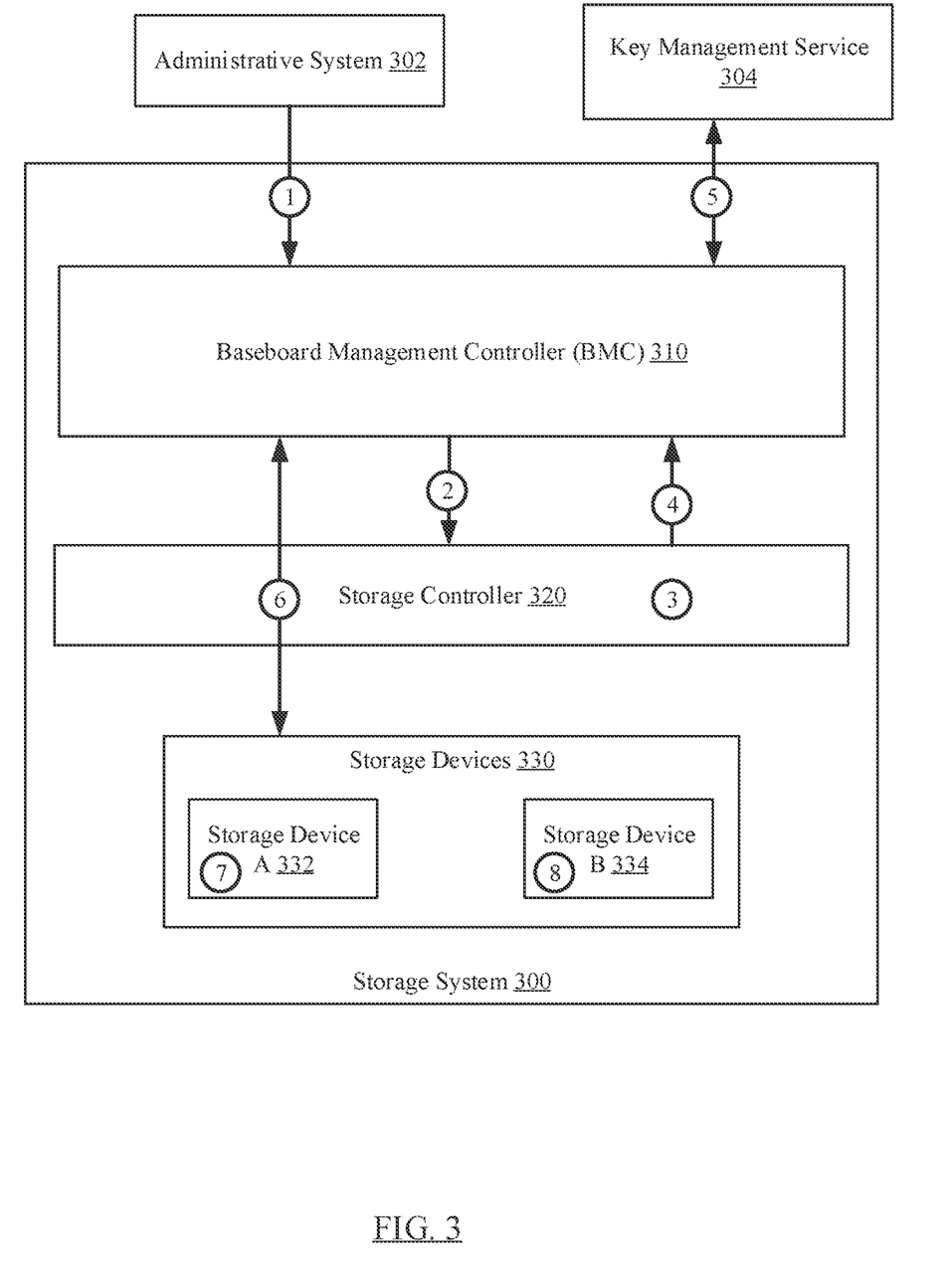
FIG. 3 shows an example in accordance with one or more embodiments of the invention.

The following section describes an example. The example is not intended to limit the invention. Turning to the example, consider a scenario in which a storage system is utilized to store data. FIG. 3 shows an example system including an administrative system (302), a key management service (304), and a storage system (300). The storage system (300) includes a baseboard management controller (BMC) (310), and a storage controller (320), and storage devices (330). For the sake of brevity, not all components of the example system may be illustrated in FIG. 3.

The administrative system (302) sends a security mode request to the BMC (310) that specifies setting the storage controller (310) to a secure mode [1]. The BMC (310), in response to the security mode request, initiates a boot-up of the storage controller (320), and specifies that the storage controller operate in the secure mode [2].

The storage controller (320) initiates the boot-up in accordance with FIG. 2B. Specifically, the storage controller (320) utilizes a data structure to determine the security states of the storage devices (332, 334). The storage controller (320) determines that the storage devices (332, 334) are not in a secured state. Based on the determination, the storage controller (320) sends a security operation request to the BMC (310) [4]. Based on the security operation request, the BMC (310) utilizes the services of the key management service (304) to generate a storage device key for each of the storage devices (332, 334). The key management service (304) generates the storage device keys and provides the storage device keys to the BMC (310) [5].

After obtaining the storage device keys, the BMC (310) accesses the storage devices (330), via the storage controller (320) to provide the storage device keys to be used for encrypting the data of the storage devices (330).

After obtaining the storage device keys, storage device A (332) encrypts its data using the obtained storage device key [7]. Further, storage device B (334) encrypts its data using its corresponding storage device key [8].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the efficiency of computing components in a storage system by offloading the security operations from a storage controller, which may have limited resources to provide the security operations, to a hardware resource manager. The hardware resource manager may provide methods of utilizing an external entity (e.g., a key management service) to generate and manage the storage of the keys.

Thus, embodiments of the invention may address the problem of inefficient use of computing resources in a distributed computing environment. This problem arises due to the technological nature of the environment in which storage systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a storage system, the method comprising:

obtaining, by a hardware resource manager of the storage system and from an administrative system, a security mode request for a storage controller managing the storage system comprising a plurality of storage devices,
    wherein the security mode request indicates an unsecured mode of the storage controller,
    wherein the hardware resource manager is external to the storage system and to the storage controller, and
    wherein the hardware resource manager is a baseboard management controller (BMC) managing life cycles of the storage system with the storage controller;

in response to obtaining the security mode request: identifying, by the hardware resource manager and based on the unsecured mode, security states of each of the plurality of storage devices;

obtaining, from a key management service, corresponding storage device keys using the security states;

initiating, by the hardware resource manager of the storage system and after obtaining the storage device keys, a boot-up of the storage controller;

making a determination, by the storage controller and after initiating the boot-up, that the storage controller is in a secured mode;

based on the determination:
    identifying a security state of each of the plurality of storage devices;
    determining that a storage device of the plurality of storage devices is in an unsecured state; and
    based on the unsecured state, sending, by the storage controller, a security operation request for securing the storage device;
    in response to receiving the security operation request:
        obtaining, by the hardware resource manager, a new storage device key for the storage device from the key management service;
        initiating, by the hardware resource manager, a security algorithm on the storage device using the new storage device key to obtain a secured storage device and generate a secure state response,
        wherein the key management service is external to the storage system,
        wherein the key management service manages storage and generation of the storage device keys and the new storage device key, and
        wherein the storage controller acts as a pass-through entity as the hardware resource manager initiates the security algorithm on the storage device;
    obtaining the secure state response from the hardware resource manager corresponding to securing the storage device; and
    based on the secure state response, resuming operation of the storage controller based on the secure mode.

2. The method of claim 1, wherein the security algorithm comprises performing, by the storage device, an encryption algorithm on data stored in the storage device.

3. The method of claim 1, further comprising:

obtaining, by the storage controller, a notification for a new storage device in the storage system; and based on the notification:
    making a second determination that the new storage device is in a secured state;
    based on the second determination:
        sending a second security operation request to the hardware resource manager for performing an unlocking operation of the new storage device;

obtaining a response from the hardware resource manager for the unlocking the new storage device.

4. The method of claim 1, further comprising:
obtaining, by the storage controller, a notification for a new storage device in the storage system; and
based on the notification:
　making a second determination that the new storage device is in the unsecured state;
　based on the second determination:
　　sending, by the storage controller, a second security operation request for securing the new storage device;
　　obtaining a second secure state response from the hardware resource manager corresponding to securing the new storage device,
　　wherein the second secure state response comprises a notification that data in the new storage device is encrypted using a second new storage device key.

5. The method of claim 1, further comprising:
after resuming the operation of the storage controller, obtaining, by the hardware resource manager, a notification to switch the storage controller to the unsecured mode; and
based on the notification:
　determining that the storage device is in a secured state;
　initiating a security revert process of the storage device; and
　initiating a reboot of the storage controller in the unsecure mode.

6. A system for managing a storage system, comprising:
a storage controller managing the storage system;
the storage system comprising a plurality of storage devices;
a hardware resource manager programmed to:
　obtain, from an administrative system, a security mode request for the storage controller,
　　wherein the security mode request indicates an unsecured mode of the storage controller,
　　wherein the hardware resource manager is external to the storage system and to the storage controller, and
　　wherein the hardware resource manager is a baseboard management controller (BMC) managing life cycles of the storage system with the storage controller;
　in response to obtaining the security mode request and based on the unsecured mode: identify security states of each of the plurality of storage devices;
　obtain, from a key management service, corresponding storage device keys using the security states;
　initiate, after obtaining the storage device keys, a boot-up of the storage controller;
the storage controller is programmed to:
　make a determination that the storage controller is in a secured mode;
　based on the determination:
　　identify a security state of each of the plurality of storage devices;
　　determine that a storage device of the plurality of storage devices is in an unsecured state; and
　　based on the unsecured state, send a security operation request for securing the storage device;
　　obtain a secure state response from the hardware resource manager corresponding to securing the storage device; and
　　based on the secure state response, resume operation of the storage controller based on the secure mode,
wherein the hardware resource manager is further programmed to:
　in response to receiving the security operation request:
　　obtaining a new storage device key for the storage device from the key management service; and
　　initiating a security algorithm on the storage device using the new storage device key to obtain a secured storage device and generate the secure state response,
　wherein the key management service is external to the storage system,
　wherein the key management service manages storage and generation of the storage device keys and the new storage device key, and
　wherein the storage controller acts as a pass-through entity as the hardware resource manager initiates the security algorithm on the storage device.

7. The system of claim 6, wherein the security algorithm comprises performing, by the storage device, an encryption algorithm on data stored in the storage device.

8. The system of claim 6, wherein the storage controller is further programmed to:
obtain a notification for a new storage device in the storage system; and
based on the notification:
　make a second determination that the new storage device is in a secured state;
　based on the second determination:
　　send a second security operation request to the hardware resource manager for performing an unlocking operation of the new storage device;
　　obtain a response from the hardware resource manager for the unlocking the new storage device.

9. The system of claim 6, wherein the storage controller is further programmed to:
obtain a notification for a new storage device in the storage system; and
based on the notification:
　make a second determination that the new storage device is in the unsecured state;
　based on the second determination:
　　send, by the storage controller, a second security operation request for securing the new storage device;
　　obtain a second secure state response from the hardware resource manager corresponding to securing the new storage device,
　　wherein the second secure state response comprises a notification that data in the new storage device is encrypted using a second new storage device key.

10. The system of claim 6, wherein the hardware resource manager is further programmed to:
after resuming the operation of the storage controller, obtain a notification to switch the storage controller to the unsecured mode; and
based on the notification:
　determine that the storage device is in a secured state;
　initiate a security revert process of the storage device; and
　initiate a reboot of the storage controller in the unsecure mode.

* * * * *